(12) United States Patent
Appleman

(10) Patent No.: US 7,578,515 B2
(45) Date of Patent: Aug. 25, 2009

(54) SECTIONAL BICYCLE

(76) Inventor: Harry Appleman, P.O. Box 332, Pewaukee, WI (US) 53072

( * ) Notice: Subject to any disclaimer, the term of this patent is extended or adjusted under 35 U.S.C. 154(b) by 0 days.

(21) Appl. No.: 11/699,857

(22) Filed: Jan. 30, 2007

(65) Prior Publication Data

US 2007/0273125 A1    Nov. 29, 2007

Related U.S. Application Data

(60) Provisional application No. 60/808,368, filed on May 25, 2006.

(51) Int. Cl.
*B62K 15/00* (2006.01)
(52) U.S. Cl. ........................ 280/287; 280/278
(58) Field of Classification Search ............... 280/278, 280/287; 403/110, 196, 398
See application file for complete search history.

(56) References Cited

U.S. PATENT DOCUMENTS

| | | | |
|---|---|---|---|
| 599,978 A | | 3/1898 | Tanner |
| 1,428,496 A | * | 9/1922 | Roquefort-Villeneuve .. 280/278 |
| 1,584,314 A | * | 5/1926 | Mamiya ...................... 280/278 |
| 2,283,671 A | | 5/1942 | Finlay et al. |
| 2,777,711 A | | 1/1957 | Yokomaki |
| 3,015,498 A | * | 1/1962 | Tanaka et al. ............... 280/278 |
| 3,220,748 A | * | 11/1965 | Moulton ..................... 280/287 |
| 3,294,416 A | | 12/1966 | Carnielli |
| 3,359,012 A | * | 12/1967 | Westerheide ................ 280/287 |
| 3,645,212 A | | 2/1972 | Dahlstrom |
| 3,807,762 A | * | 4/1974 | Ogisu, Noriyuki .......... 280/287 |
| 3,814,462 A | | 6/1974 | Kelly |
| 3,854,755 A | * | 12/1974 | Tang .......................... 280/278 |
| 3,865,403 A | | 2/1975 | Majerus |
| 3,889,974 A | * | 6/1975 | Kallander .................... 280/251 |
| 3,979,136 A | * | 9/1976 | Lassiere ...................... 280/278 |
| 4,022,485 A | | 5/1977 | Cox |
| 4,182,522 A | | 1/1980 | Ritchie |
| 4,417,745 A | | 11/1983 | Shomo |
| 4,421,337 A | | 12/1983 | Pratt |
| 4,440,414 A | | 4/1984 | Wang |
| 4,441,729 A | * | 4/1984 | Underwood ................ 280/278 |
| 4,582,335 A | | 4/1986 | Paioli et al. |
| 4,611,945 A | | 9/1986 | Diego |

(Continued)

FOREIGN PATENT DOCUMENTS

BE         628783        6/1983

(Continued)

*Primary Examiner*—Lesley D Morris
*Assistant Examiner*—Maurice Williams
(74) *Attorney, Agent, or Firm*—Ryan Kromholz & Manion S.C.

(57) ABSTRACT

A modular bicycle comprising a first section having a front frame section and a first tire, a second section being couplable to the first section and comprising a central frame, and a third section being couplable to the second section and the first section, with the third section comprising a rear frame section, a second tire, and a handle bar. The bicycle also comprises pedals that are removably securable to the crank arms of the bicycle.

The pedals comprise a foot rest, a base section secured to the foot rest, and a locking member pivotally connected to the base section. The locking member is insertable into a through bore located on the crank arm and is pivotally rotatable towards the crank arm, thereby securing the pedal to the crank arm.

14 Claims, 9 Drawing Sheets

U.S. PATENT DOCUMENTS

| | | | |
|---|---|---|---|
| 4,824,131 A * | 4/1989 | Thay | 280/278 |
| 5,125,678 A * | 6/1992 | Bogen | 280/278 |
| 5,558,349 A * | 9/1996 | Rubin | 280/287 |
| 5,716,065 A * | 2/1998 | Liu | 280/204 |
| 5,887,882 A * | 3/1999 | Atchison | 280/288.1 |
| 6,032,971 A * | 3/2000 | Herder | 280/278 |
| 6,135,478 A * | 10/2000 | Montague | 280/287 |
| 6,286,848 B1 * | 9/2001 | Augustin | 280/287 |
| 6,581,492 B1 * | 6/2003 | Chen | 74/551.3 |
| 6,612,597 B2 * | 9/2003 | Baker et al. | 280/204 |
| 6,929,277 B2 * | 8/2005 | Chao | 280/278 |
| 2003/0080531 A1 * | 5/2003 | Ritchey | 280/281.1 |

FOREIGN PATENT DOCUMENTS

| | | |
|---|---|---|
| DE | 147126 | 12/1903 |
| DE | 309357 | 6/1917 |
| DE | 504805 | 8/1930 |
| DE | 808190 | 7/1951 |
| DE | 812156 | 8/1951 |
| DE | 822347 | 11/1951 |
| DE | 1084159 | 6/1960 |
| DE | 1905388 | 7/1964 |
| DE | 1810445 | 7/1969 |
| DE | 3230624 | 2/1984 |
| DE | 3701803 | 1/1987 |
| FR | 1443948 | 5/1966 |
| FR | 867505 | 1/1987 |
| GB | 415843 | 11/1941 |
| GB | 548348 | 10/1942 |
| GB | 578384 | 6/1946 |
| GB | 604113 | 6/1948 |
| GB | 1267647 | 3/1972 |
| GB | 2171656 | 9/1986 |
| SU | 472054 | 9/1975 |

* cited by examiner

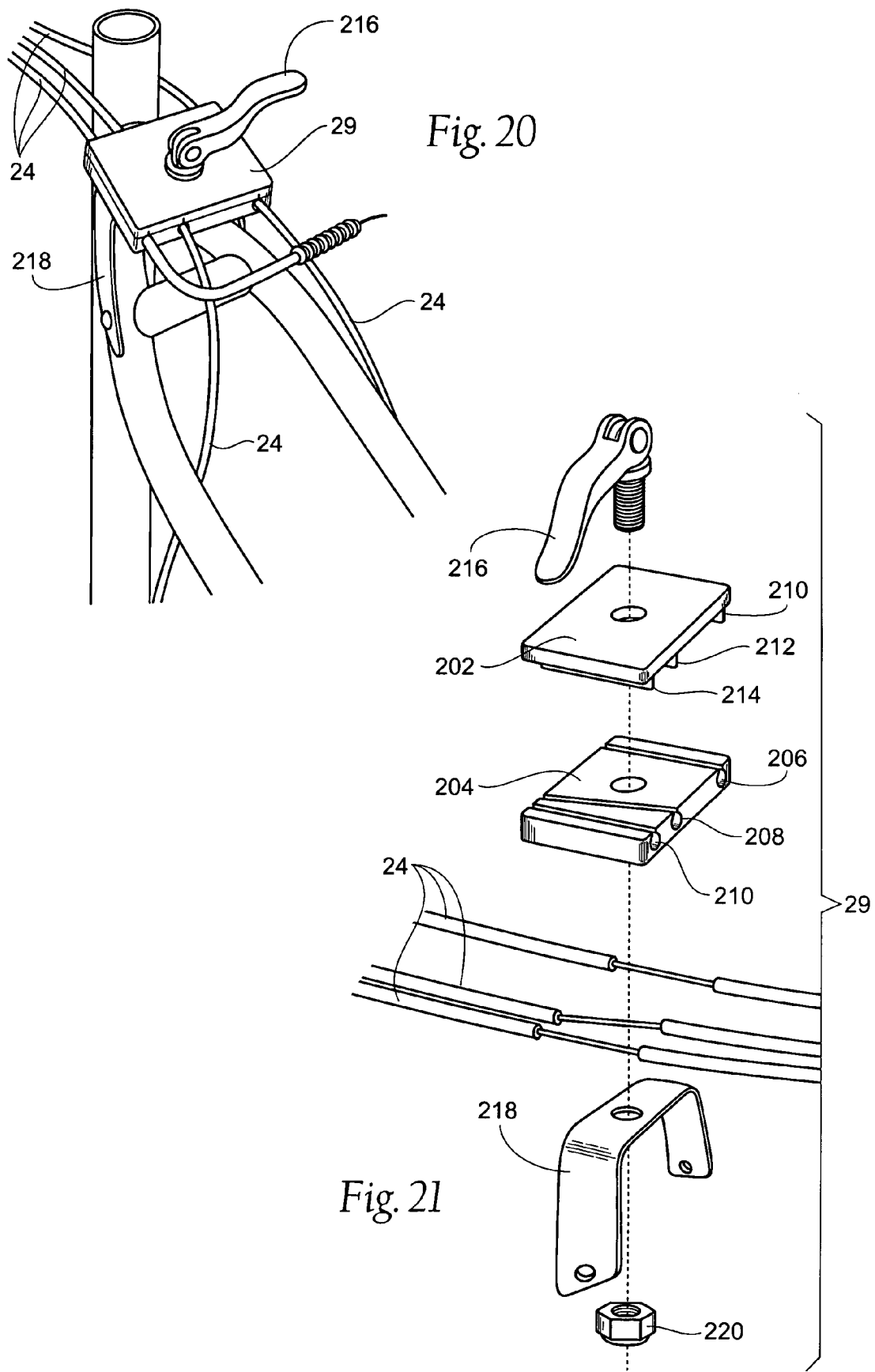

SECTIONAL BICYCLE

RELATED APPLICATION

This application claims the benefit of U.S. Provisional Patent Application Ser. No. 60/808,368, filed 25 May 2006, and entitled "Sectional Bicycle."

BACKGROUND OF THE INVENTION

The present relates to bicycle and, more specifically, to bicycles that can be collapsed for storage purposes.

In today's urban settings, fewer and fewer areas are accessible for one to ride a bicycle, especially in a recreational sense. Consequently cyclists are more frequently transporting bicycles to distant areas where they may be able to ride their bikes. To accommodate such trips, bicycle makers have developed bikes that can be reduced in size for easier transportation. Common ways of reducing sizes have been to have removable front tires on the bicycles and to have frame designs that allow the front and rear tires to be folded inwardly with respect to the frame. Examples of such folding or collapsing bikes may be seen in Bogen, U.S. Pat. No. 5,125,678 and Hellestam et al., U.S. Pat. No. 4,895,386. While these bicycles have somewhat reduced the space that a bicycle during transport, they still take up greater amounts of space than desired.

Other bicycle designs have been designed so that the bicycle could be broken down into several pieces or sections. Examples of such bicycles are shown in Geisel, U.S. Pat. No. 3,876,231, Underwood, U.S. Pat. No. 4,441,729, and Chao, U.S. Pat. No. 6,929,277. While these bicycles may be broken down into several sections, they are not the easiest to reassemble, and have several small parts that must be organized when storing the bicycle. Such arrangements could be difficult to assemble in a rough terrain, such as a park or other wildlife area. Likewise, these bikes cannot be assembled in a short period of time, such as a few minutes. Furthermore, such designs do not take into account bicycles that have multiple gears, such as ten or fifteen speed bicycles.

Thus, it is desirous to design a sectional bike of any gear arrangement that could be easily disassembled and reassembled and transported.

SUMMARY OF THE INVENTION

The present invention provides a bicycle that can be disassembled into a few sections that are completely separable. Generally, the bicycle comprises a front section comprising the front wheel and the front brake, a central frame section, and a rear section comprising the rear wheel, chain assembly, and the handle bars. The bike is easily disassembled and reassembled quickly and efficiently, and is sturdy enough for such rugged activities as mountain biking and the like. The connections for each section are uniquely designed, as well. The bicycle is designed for any type of bicycles, from single gear bicycles to multiple gear bicycles. The bicycle provides a locking mechanism for various cables that run from the controls and levers located on the handle bars to the brakes and derailleurs of the bicycle. The locking mechanism allows for the proper tension to be kept on the various components during assembly and disassembly of the bicycle.

The pedals attached to the bike also have a unique arrangement that allows them to be easily attached and reattached from the bicycle. The pedals do not have the problems that prior art devices may encounter, such as problems associated with slippage or improper folding of the pedals when the bicycle is in use.

The attachment of the handle bars to the frame also provides a unique arrangement, which provides for easy interaction and attachment.

These and other novel features of the present invention will become evident with regard to the drawings and the specification.

BRIEF DESCRIPTION OF THE DRAWINGS

FIG. 20 is a partial perspective view of a bicycle frame and a cable securing device used in accordance with the present invention.

FIG. 21 is an exploded view of the cable securing device shown in FIG. 20.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
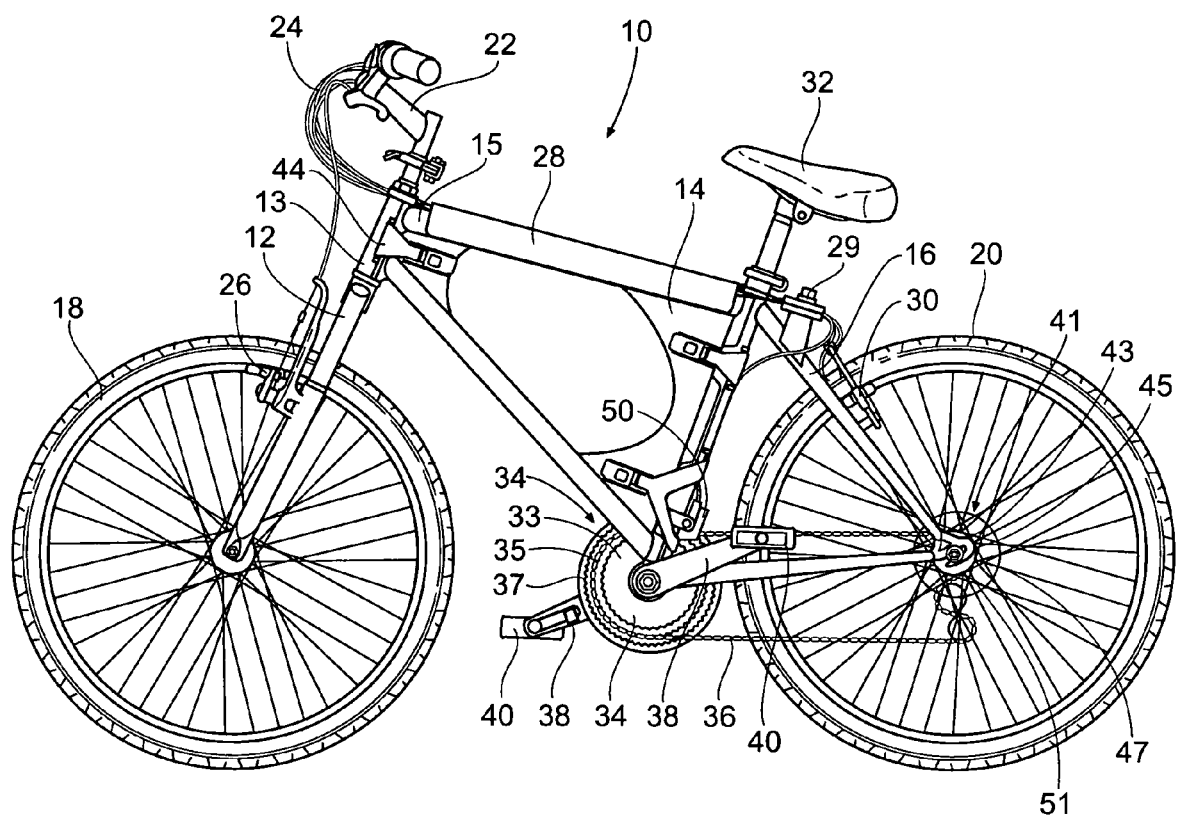
FIG. 1 is a perspective view of a bicycle according to the present invention.

FIG. 1 depicts a bicycle 10 according to the present invention. As will be shown, the bicycle 10 provides a sturdy construction that allows the bicycle to be used normally in all types of terrain, while being able to be collapsed quickly and easily for storage and transportation. The bicycle 10 generally comprises a first or front section 12 comprising a front frame section 13, a second section 15 comprising a central frame 14, and a rear or third section 16. The front section 12 supports a first or front tire 18, and the rear section 16 supports a tire 20. The front section 12 also supports handle bars 22, which supports a variety of cables 24 attached to various components, such as a front brake 26, a rear brake 30, a front derailleur 49, a rear derailleur 51 and a cable guide 50. The cable guide 50 is not necessary for all arrangements of the gears and cables. The cables 24 that travel to the various items located on the rear section 16 are secured to the frame 14 by way of a cable holder 28 and a cable securing device 29. The rear section 16 further supports a chain assembly 31 which comprise a front or crank sprocket assembly 34, a chain 36 and a rear of drive sprocket assembly 41. The crank sprocket assembly 34 further comprises a plurality of individual crank sprockets 33, 35, and 37 and the drive sprocket assembly 41 comprises a plurality of individual drive sprockets 43, 45, and 47. It is understood that the bicycle could have more or fewer crank and drive sprockets and still fall within the scope of the present invention.

Still referring to FIG. 1, the rear section further supports a pair of crank arms 38, and a pair of pedals 40. The bicycle 10 shown in FIG. 1 is exemplary of several different arrangements that the present invention will fall within. The following figures will give further details and description of the various novel features of the present invention.

Figure 2:
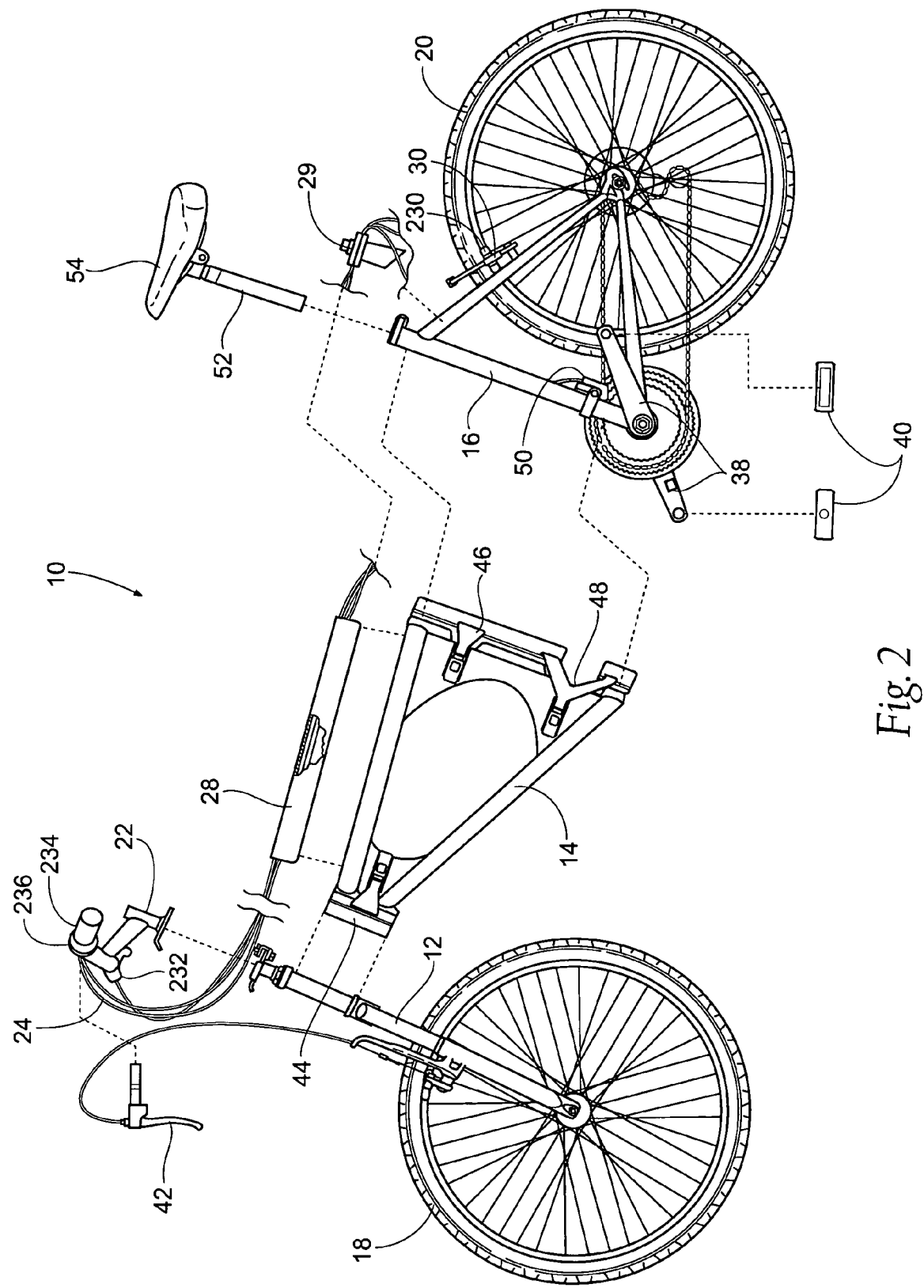
FIG. 2 is an exploded view of the bicycle of FIG. 1.

FIG. 2 provides an exploded view of the bicycle 10. The front section 12, the frame 14, and the rear section 16 are separable from one another. The handlebars 22 are detachable from the front section 12, with the handlebars 22 and the cables 24, passing through the securing device 29 and leading to the rear brake 30 and the derailleurs 49 and 51, being kept attached to the rear section 16. The cables 24 are kept from being mixed-up or tangled by way of the cable holder 28, and the securing device 29 allows the cables 24 to be properly tensioned even when the bicycle is disassembled. A front brake handle 42 is kept attached to the front brake 26 and the front section 12. The frame 14 is attached to the front section 12 by way of a first clamp 44. The frame 14 is attached to the rear section by way of a pair of clamps 46, 48. The clamps will be discussed in more detail with respect to FIGS. 7-12. It is understood that more or fewer clamps may be used for attaching the various sections of the bicycle 10 and still fall within the scope of the present invention.

Still referring to FIG. 2, the rear section 16 supports a post 52 and a seat 54, which are removable from the rear section 16. As previously stated, the rear section 16 supports the crank arms 38, which in turn support the pedals 40. The pedals 40 are removable from the crank arms 38 and will be described in further detail with respect to FIGS. 16-19. The rear brake 30 comprises brake pads that form a brake pad mechanism 230, which are connected to a brake lever 232 located on the handle bars 22 by way of one of the cables 24. The handle bars 22 also support gear shifters 232 and 234 that are connected to a respective derailleur 49 and 51 by way of a respective cable 24.

As FIG. 2 shows, the various sections of the bicycle 10 are separable from one another. However, in comparison with previous sectional or separable bicycles, the present invention allows for easy assembly and disassembly. It is possible to assemble the bicycle in a few minutes, possibly in less than two minutes. As will be discussed further, the ease of attaching the front section 12 and rear section 16 to the frame 16 with the clamps 44, 46, 48 makes the present invention an improvement over the prior art.

Figure 3:
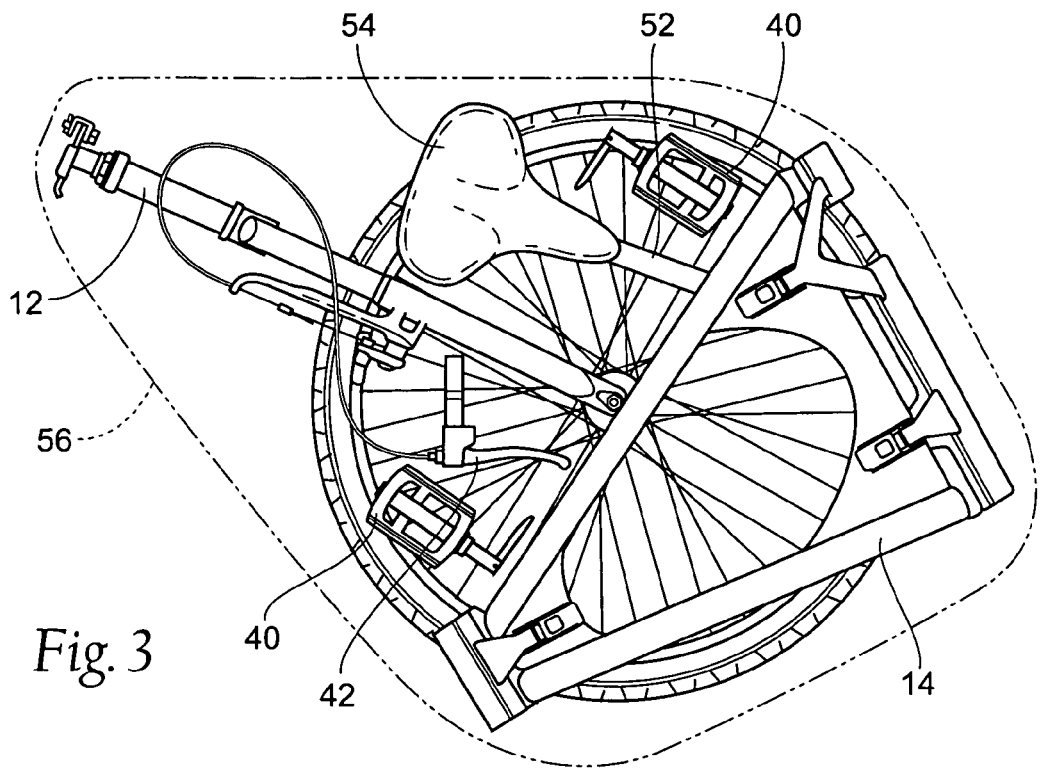
FIG. 3 is an overhead view of a collapsed front section and frame of the bicycle of FIG. 1 within a storage bag.
Figure 4:
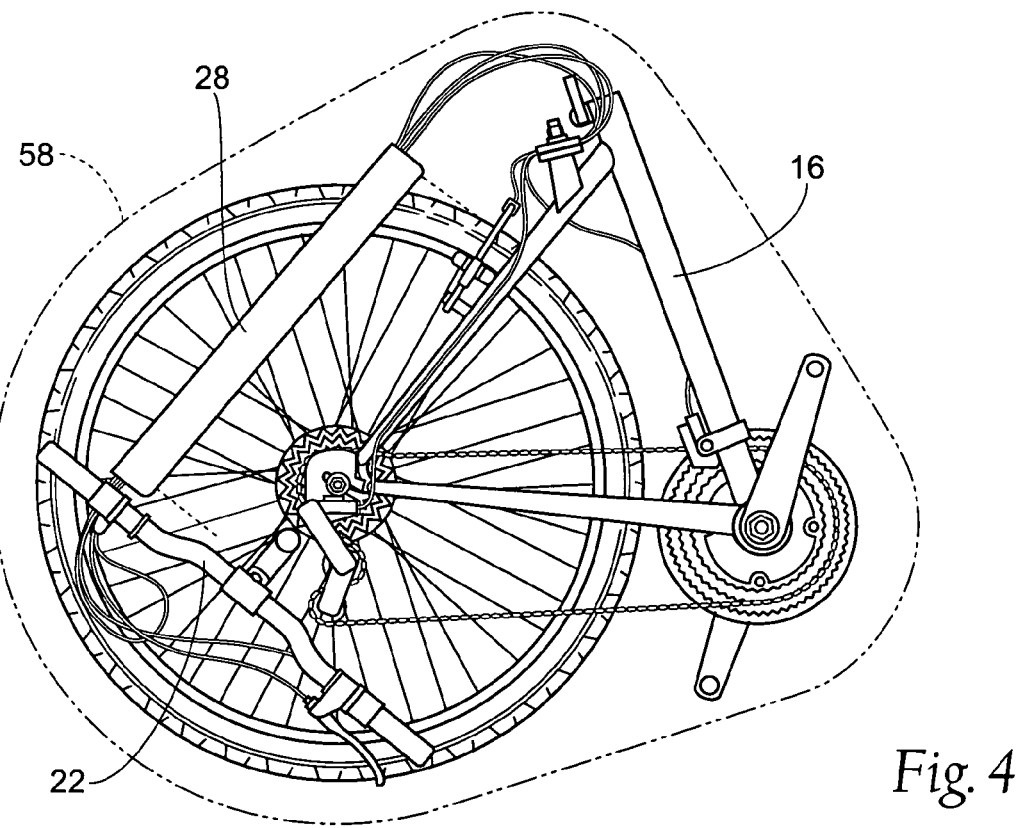
FIG. 4 is an overhead view of a collapsed rear section of the bicycle of FIG. 1 within a storage bag.

FIGS. 3 and 4 show the bicycle stored away in a pair of bags 56 and 58 for storage and transportation. In FIG. 3, the bag 56 houses the front section 12, including the front brake handle 42, the frame 14, the seat 54 and the post 52, and the pedals 40. The seat 54 preferably folds inwardly towards the post 52 to further minimize the area required for storage, while minimizing time needed to refasten or rejoin different parts of the bicycle. In FIG. 4, the bag 58 houses the rear section 16, the handle bars 22 and the cable holder 28. The arrangement of the specific parts in the bags 56, 58 is designed to minimize the area required for storage of the bicycle. However, it is understood that other arrangements are possible.

Figure 5:
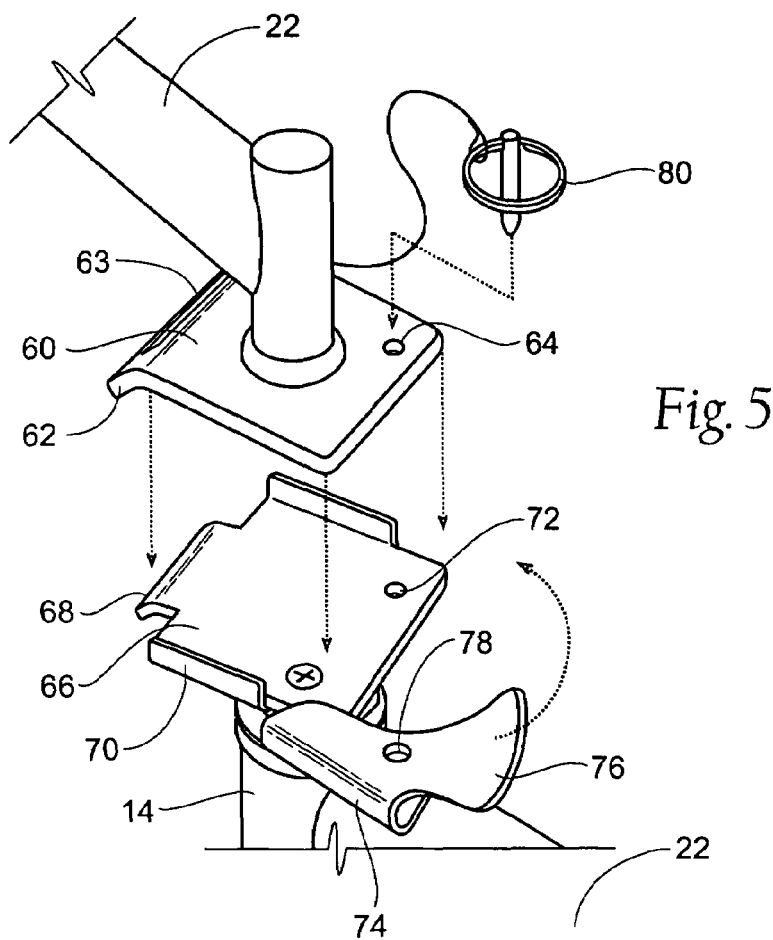
FIG. 5 is a close-up, exploded, perspective view of a handle bar attachment according to the present invention.
Figure 6:
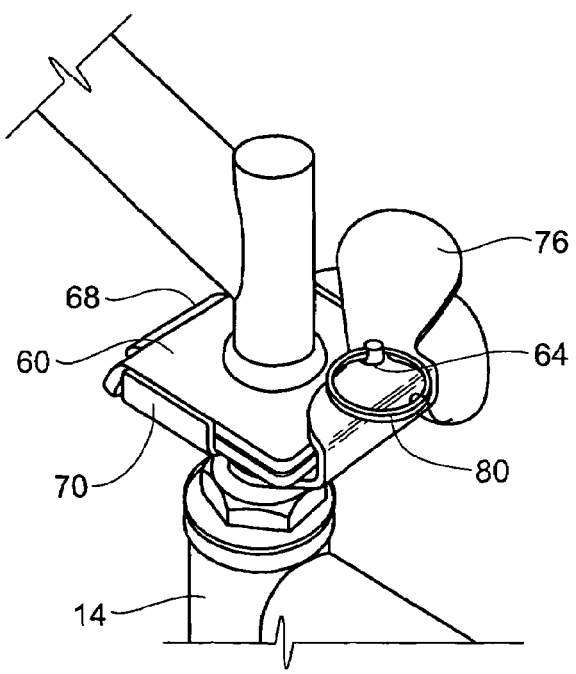
FIG. 6 is a close-up, perspective view of the handle bar attachment of FIG. 5.

FIGS. 5 and 6 provide close-up views of the handle bars 22 and the front section 12 (see FIGS. 1 and 2). The handle bars 22 and the front section 12 are mated together with a unique, quick-release structure. The handle bars 22 are supported by a base plate 60 which further comprises an angled lip 62. A slot 63 is located within the angled lip 62. A hole 64 is located in the base plate 60. The front section 12 supports a support plate 66 having a support lip 68 and a pair of upstanding walls 70. A hole 72 is also located on the support plate 66. The arrangement of the locking or latching assembly between the handle bars 22 and the front section is designed so that the individual sections easily mate with one another. That is, the base plate 60 and the support plate 66 are designed to be seated firmly together, while the support lip 68 is designed to be inserted into the slot 63. The upstanding walls 70 further insures the base plate 60 and the support plate 66 are properly aligned, and the wall provides further supporting structure for the device. While it is preferred that a pair of upstanding walls 70 are used for sufficient alignment of the base plate 60 and the support place 66, it is understood that one wall 70 could be used and still fall within the scope of the invention.

Still referring to FIGS. 5 and 6, a clamping section 74 is pivotally connected to the support plate 66. The clamping section 74 further comprises a flange 76 and a hole 78. The flange 76 is flared so that it is easy for the user to move the flange 76 and the clamping section 74 towards the position in FIG. 6. The hole 78 on the clamping section 74 aligns with the holes 64 and 72 when moved to the closed or clamp position shown in FIG. 6. A pin 80 will be inserted through the holes 64, 72, and 80 to secure the handle bars 22 to the front section, thereby providing a secure, easy to assemble arrangement. As will be understood, any similar locking or securing means similar to the pin may be used in the present invention and still fall within the scope of the present invention. The arrangement of the intersection of the slot 63 and the support lip 68 together with the clamping section 74 provides a durable structure that is easy to assemble, which was not known previously in the prior art.

Figure 7:
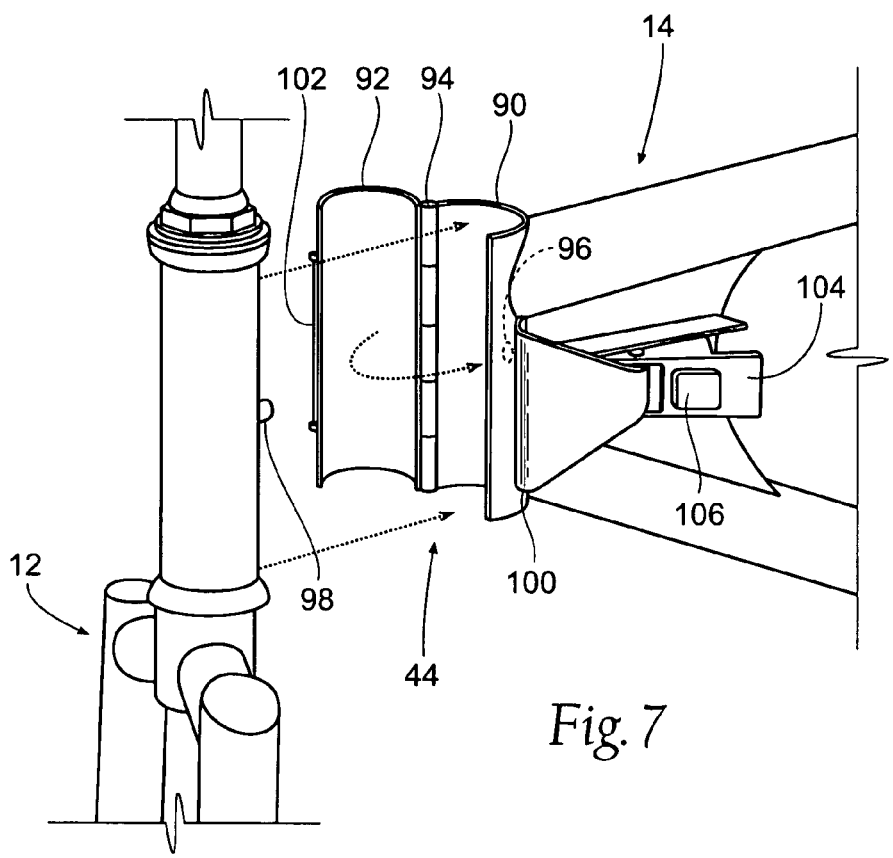
FIG. 7 is a close-up, exploded, perspective view of attachment means for the frame and the front section of the present invention.
Figure 8:
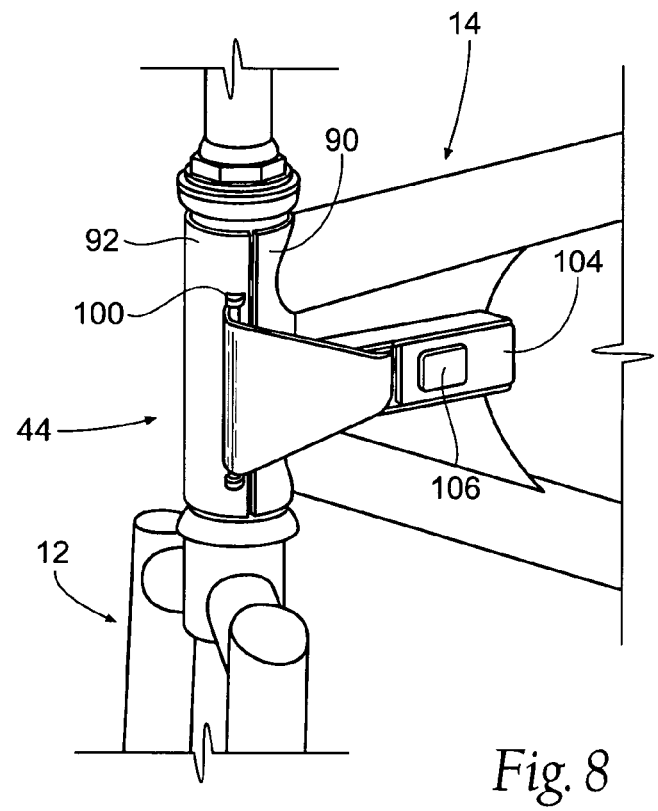
FIG. 8 is a close-up, perspective view of the attachment means of FIG. 7.
Figure 9:
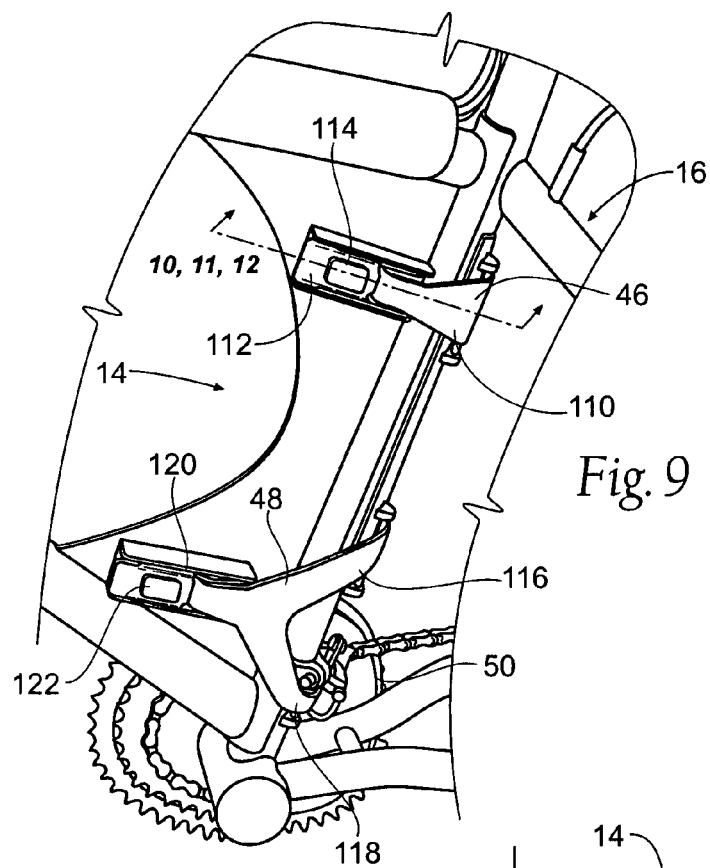
FIG. 9 is a close-up, perspective view of attachment means for the frame and the rear section of the present invention.

Referring to FIGS. 7 and 8, the front section 12 is shown being attached to the frame 14. As previously stated, the clamp 44 is used to secure the two sections together. The clamp 44 generally comprises a first section 90 integrally formed with the frame 14, and a second section 92 that is pivotally connected to the first section 90 by ways of a hinge 94. The first section 90 further comprises a hole 96 that is aligned with a stud 98 located on the front section 12 when the clamp 44 surrounds the front section 12. The size and length of the stud 98 may be of any suitable dimensions, and preferably is of a sufficient dimension so that when the stud 98 is inserted into the hole 96, there is excess length so that a pin or similar item (not shown) may be inserted into the stud 98 for extra security purposes.

Still referring to FIGS. 7 and 8, the first section 90 further comprises a clasp 100 that interacts with an overhang 102 when the clamp 44 is positioned around the front section 12.

The clasp 100 and the overhang 102 will then be pulled together tightly with a locking section 104, which provides sufficient tension to couple the clasp 100 and the overhang tightly together. A release 106 may be located on the locking section 104 for disassembly. The arrangement provides a solidly secured bicycle by using simple and easy to assemble parts.

FIGS. 9-12 further depict the interaction and securing of the frame 14 to the rear section 16. As previously noted, the clamps 46 and 48 secure the frame to the rear section 16, similarly as described with the clamp 44 securing the front section 12 to the frame 14. Similarly to the clamp 44, the clamp 46 has a clasp 110 connected to a locking section 112. The locking section also has a release 114 that allows the clamp 44 to be released, if necessary. The clamp 48 works similarly to the clamps 44 and 46, but is preferably comprised of a pair of clasps 116, 118 instead of a single clasp. The pair of clasps 116, 118 allows the frame 14 to be secured to the rear section 16 without interfering with the cable guide 50 and the cables connected thereto. The clamp 48 also has a locking section 120 with a release 122.

Figure 10:
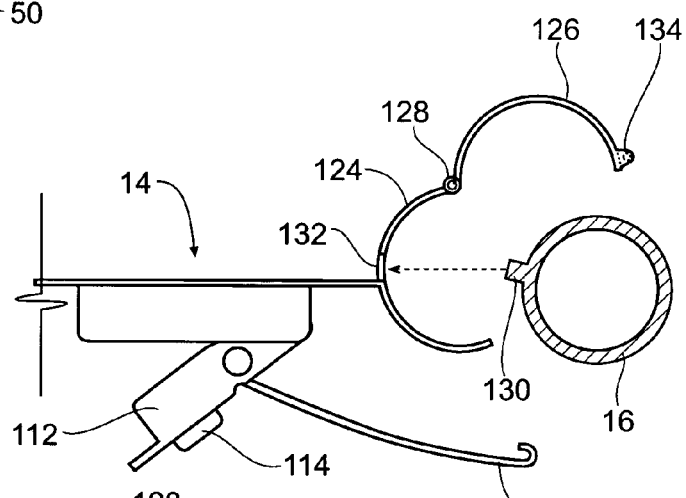
FIG. 10 is an overhead view of the attachment means of FIG. 9 in an open position taken along line 10-10 of FIG. 9.
Figure 11:
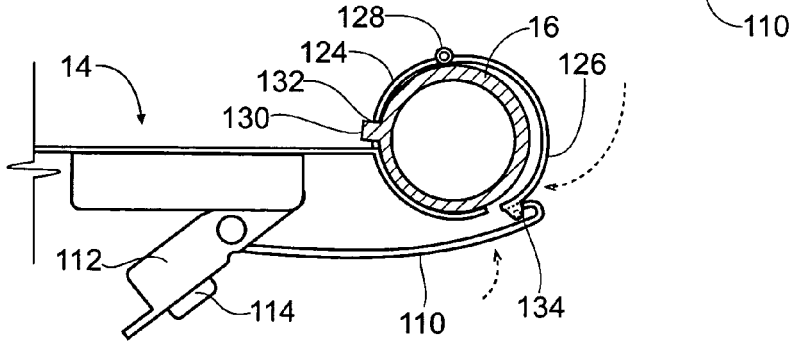
FIG. 11 is an overhead view of the attachment means of FIG. 9 in a second open position taken along line 11-11 of FIG. 9.
Figure 12:
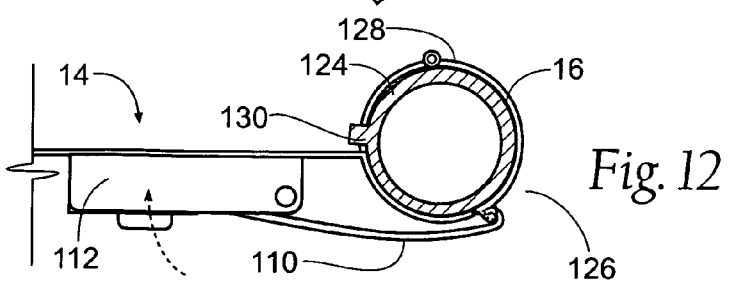
FIG. 12 is an overhead view of the attachment means of FIG. 9 in a closed position taken along line 12-12 of FIG. 9.

Referring further to FIGS. 10-12, the interaction between the clamp 46 and the rear section 16 is shown in detail. The clamp 46 has a first section 124 that is integrally connected to the frame 14 and a second section 126 that is pivotally connected to the first section 124 by way of a hinge 128. The rear section 16 and the frame 14 will be aligned by inserting a stud 130 located on the rear section 16 into a hole 132 located on the frame 14. The stud 130 may be of any length and may be of sufficient length so that the stud may receive a possible device for locking or securing the stud 130 in place (not shown). When the clamp 46 surrounds the rear section 16, a flange 134 located on the second section 126 interacts with the clasp 110, as shown in FIG. 11. The locking section 112 is then pushed inwardly towards the frame 14, thereby securing the frame 14 and rear section 16 together in a sturdy manner.

Figure 13:
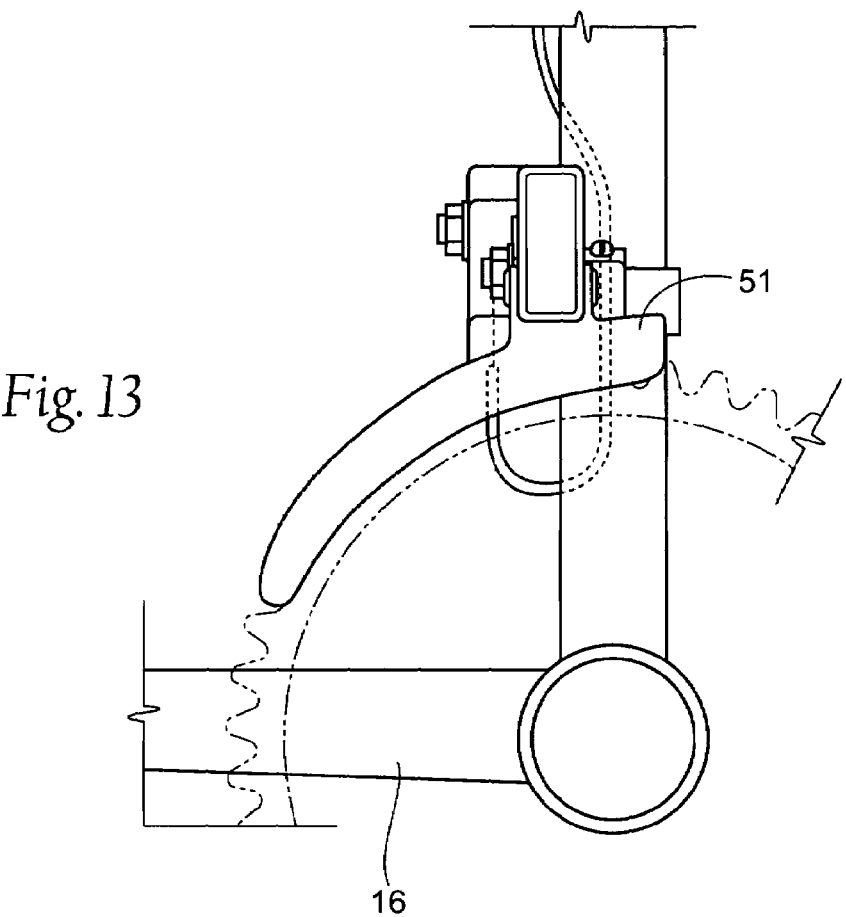
FIG. 13 is a close-up, sectional view of a derailleur used in the present invention.

FIG. 13 provides a close-up view of the front derailleur 51. As compared to FIG. 1, the cable guide 50 is not present in FIG. 13. The cable guide 50 is arranged for a bottom pull cable so that it will not interfere with the bracket 48 (see FIG. 2). While any derailleur and cable guide arrangement may be used in the present invention, the current arrangement allows for the maximum stability, without compromising the shifting functions of the bicycle. It is also possible to use an overhead pull cable arrangement, as well, as id demonstrated in FIG. 13.

Figure 14:
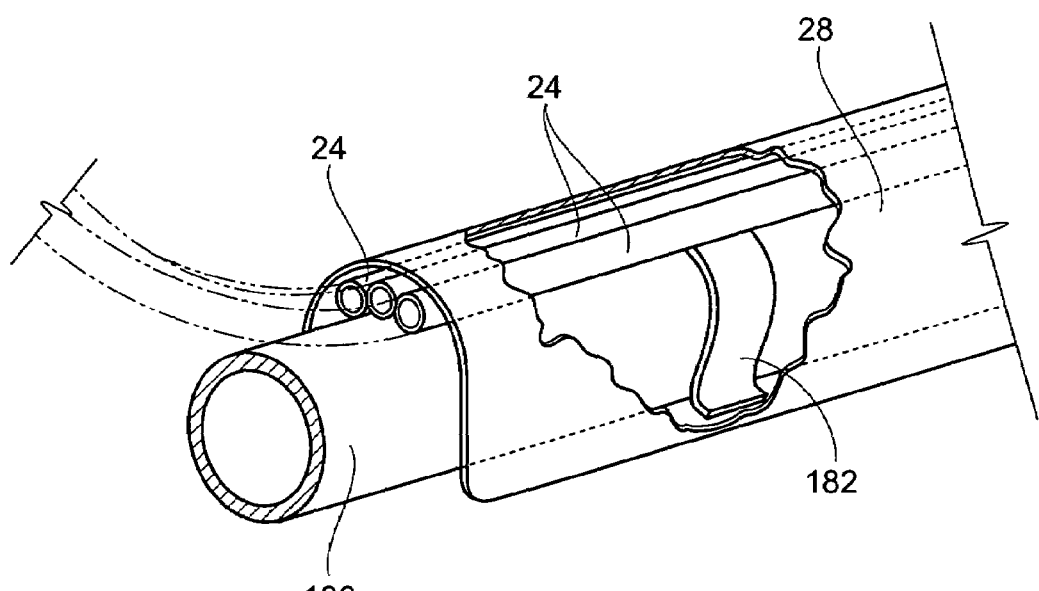
FIG. 14 is a close-up, perspective, partially cut-away view of a cable attachment assembly used in the present invention.
Figure 15:
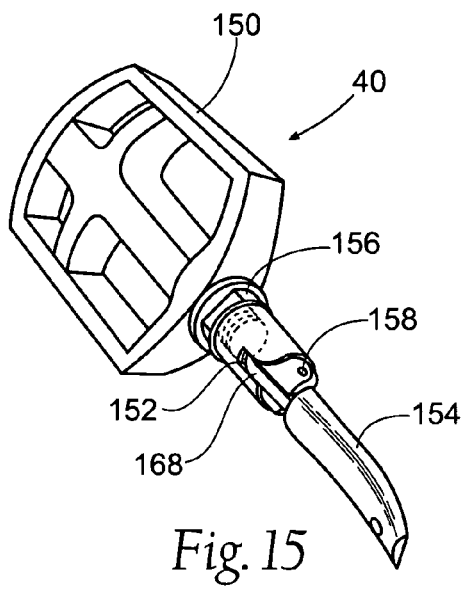
FIG. 15 is a perspective view of a pedal used in the present invention.

FIG. 14 provides a close-up, partially cut-away view of the cable holder 28. The cable holder 28 is secured to a cross bar 180 by way of a locking clip 182. The cables 24 are situated between the locking clip 182 and the upper surface of the cable holder 28, thereby preventing the cables 24 from becoming tangled. The arrangement provides easy attachment means, and further assists in the bicycle being assemble and disassembled. It should be understood that each cables 24 is connected to a specific device, such as rear brake 30, derailleurs 49 and 51, and there will be more or fewer cables 24 depending on the number of specific devices included on the bicycle 10.

Figure 16:
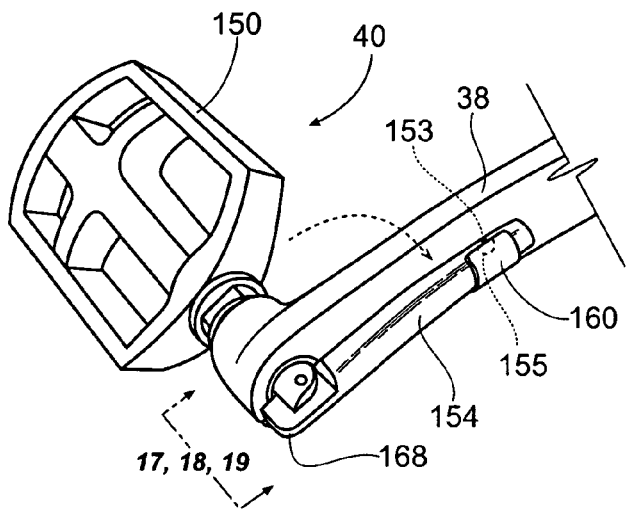
FIG. 16 is a perspective view of the pedal of FIG. 15 attached to a crank arm.

FIGS. 15-19 depict the pedal 40 used in the present invention. The pedals 40 are able to be easily attached and removed from the crank arms 38 when necessary, thereby further minimizing space when storing the bicycle 10. The pedal 40 generally comprises a foot rest 150, a base member 152, and a locking member 154. The foot rest 150 is connected to the base member 152 with a threaded bolt 156, or any other typical connector as is known in the art. The bolt 156 allows secure connection means for the foot rest 150 and the base member 152. The base member 152 and the locking member 154 are pivotally connected by way of a hinge 158, which allows for movement in at least two axes. As shown in FIG. 16, the locking member 154 will prevent the pedal 40 from unwanted movement by sliding the locking member 154 under a clip 160 located on the crank arm 38. The locking member 154 also includes a detent 155 that will interact with a cavity 153 located on the crank arm 38. It is possible that either the detent 155 and the cavity 153, or the clip 160 could be used separately to secure the locking member 154 and still fall within the scope of the present invention. The pedal 40 will be further secured to the crank arm 38, as described in FIGS. 17-19. The arrangement provides for a solidly locked foot pedal 40 that does not have the disadvantage of prior art foldable pedals that can become disorientated when a person is actively pedaling a bicycle. The pedals do not require tools for attachment, and can be attached without the need for securing nuts or bolts. The pedals 40 take a minimal storage space and can be attached to the crank arms 38 quickly and easily.

Figure 17:
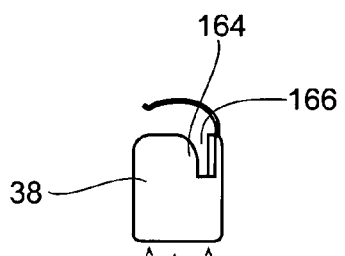
FIG. 17 is an exploded, sectional view of the pedal of FIG. 16 taken along line 17-17 of FIG. 16.
Figure 18:
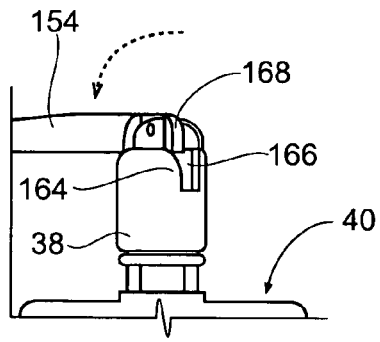
FIG. 18 is a perspective view of the pedal of FIG. 16 in a first position taken along line 18-18 of FIG. 16.
Figure 19:
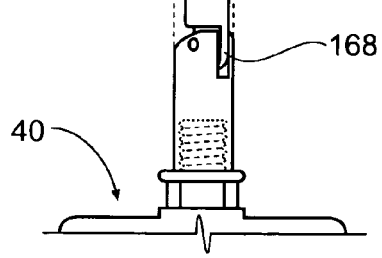
FIG. 19 is a perspective view of the pedal of FIG. 16 in a second position taken along line 19-19 of FIG. 16.
Figure 19:
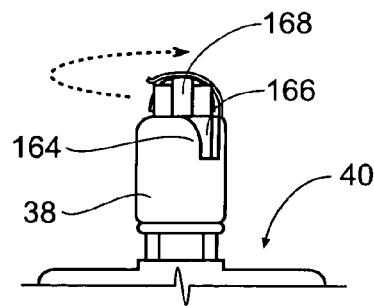

FIG. 17 shows an exploded view of the pedal 40 and the crank arm 38. The crank arm 38 has a through bore 162 generally perpendicular to the length of the crank arm 38 for receiving the base member 152 and the locking member 154. The facing surfaces of the crank arm 38 and the locking member 154 generally form camming means for providing an easier securing action for the pedal. The crank arm 38 further includes a curved surface or camming surface 164 located on the through bore 162. The through bore 162 also has a slot 166 that is generally sized to receive a tab portion 168 located on the locking member 154 when the locking member 154 is inserted through the through bore 162. As shown in FIG. 18, once the locking member 154 is inserted into the through conduit 154, the locking member is turned downwardly toward the crank arm 38. Once the locking member 154 is essentially in a parallel plane with the crank arm 38, the locking member 154 is twisted inwardly towards the crank arm 38, as shown in FIG. 19. The tab portion 168 will slide up the camming surface 164, thereby tightly securing the pedal 40 to the crank arm. Once the tab portion 168 moves past the camming surface 164, the tension between the tab portion 168 and the crank arm 38 solidly holds the pedal 40 in place. The clip 160 or the detent 153 and the cavity 155 will further secure the locking member 154 in place. The result is a stable pedal 40 that can be easily removed and attached as necessary. It is understood that the dimensions of the pedal 40 and the crank arm 38 may be altered and still fall within the scope of the present invention. For example, the crank arm 38 could be modified to be slightly larger than a typical crank arm, to provide added stability for the inserted pedal 40.

FIGS. 20 and 21 depict the cable securing device 29. When the bicycle is disassembled, the cables 24 will have a tendency to become slacken, which can lead to improper alignment of the brakes and the derailleur when reassembling the bicycle 10. The device 29 allows the cables 24 to be held in place when disassembling the bicycle, whereby the tension will be properly taut when reassembling the bicycle. Thus, the specific tensions between the respective cables 24 and the rear brake 30 and the derailleurs 49, 51 do not have to be adjusted when the bicycle 10 is reassembled, thereby significantly reducing reassembling time.

The cable securing device 29 generally comprises a top section 202 and a bottom section 204. A plurality of channels 206, 208, and 210 located within the bottom section 204 allow for respective cables 24 to be situated within one of the channels. The top section 202 comprises alignment fins 210, 212, 214 that correspond with one of the channels 206, 208, and 210 so that the top section 202 and the bottom section 204 are properly situated with one another. It is understood that the orientation of the channels and the fins could be inverted and the arrangement would still fall within the scope of the present invention.

Still referring to FIGS. 20 and 21, the securing device 29 comprises a lever 216 is inserted through the sections 202, 204 and through a bracket 218. A nut 220 secures the lever 216 to the securing device 29 and allows for the lever 216 to be properly tensioned with respect to the securing device 29. When the bicycle 10 is in normal operating conditions, the lever 216 will be in an open position, which will allow forward and backward movement of the cables 24 as necessary. When the bicycle is dismantled and stored, the lever 216 will be moved to a closed position, which secures the cables 24 in place, which minimizes any necessary adjustments of the gears and the brakes when reassembling the bicycle. As is understood, the securing device 29 could take any number of forms that would allow the cables to be secured or clamped in an operating position when the bicycle is dismantled or disassembled.

Thus, the present invention provides an easy to assemble bicycle that is easily transportable. The overall design is designed for efficiency of both assembly time and space. For instance, the pedals can be quickly attached to the bicycle, but also removable and storable when not in use. Likewise, because the sections of the bicycle are completely separate, there is less space used when storing the bike than in prior art folding bicycles. The modular bicycle can be designed for single gear arrangements or multiple gear arrangements and can be quickly assemble without the need for tools. Further, the device is designed so that assembly and disassembly will take place without the need for readjusting the tension or slack for the gears and the brakes of the device. The storage bag or container will also be preferably designed to minimize the necessary storage area for the bicycle.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

I claim:

1. A modular bicycle comprising:
   a separate first section, said first section comprising a front frame section and a first tire:
   a separate second section being directly couplable to said first section, said second section comprising a one-piece central frame comprising a cross bar and a down bar;
   a clamp located on one of said first or said second sections, said clamp being arranged to pivotally encircle the other of said first or second section and to intersect a stud located on the other of said first or said second sections, said clamp releasably and securely coupling said first section to said second section;
   a separate third section being directly couplable to said second section and said first section, said third section comprising a rear frame section, a second tire, and a handle bar, said handlebar being couplable to said front frame section; and
   a second clamp located on one of said second or said third sections, said clamp being arranged to pivotally encircle the other of said second or said third section and to intersect a stud located on the other of said second or said third sections, thereby securely coupling said second section to said third section.

2. The modular bicycle according to claim 1, further comprising:
   a rear brake for said second tire, said rear brake comprising:
   a brake pad mechanism located on said third section;
   a brake lever located on said handle bar; and
   a brake cable extending from said brake lever to said brake pads.

3. The modular bicycle according to claim 2 further comprising a locking mechanism located on said third frame section for releasably locking said brake cable at a specific tension for said rear brake when said bicycle is in a disassembled state.

4. The modular bicycle according to claim 1 further comprising:
   a chain assembly, said chain assembly comprising:
   at least one crank sprocket located on said rear frame section;
   a plurality of drive sprockets located on said rear frame section;
   a chain extending around and engaging said crank sprocket and extending around and engaging one of said drive sprockets; and
   a derailleur mechanism located on said rear frame section, said derailleur mechanism moving said chain from engagement from one said drive sprockets to another of said drive sprockets;
   a shifting mechanism located on said handle bars; and
   at least one cable extending from said shifting mechanism to said derailleur mechanism, said at least one cable and said shifting mechanism providing actuating means for said derailleur mechanism.

5. The bicycle according to claim 4 further comprising a locking mechanism located on said third frame section for releasably locking said at least one shifting cable at a specific tension when said bicycle is in a disassembled state.

6. The bicycle according to claim 5 further comprising:
   a rear brake for said second tire, said rear brake comprising:
   a brake pad mechanism located on said third section;
   a brake lever located on said handle bar;
   a brake cable extending from said brake lever to said brake pads; and
   said locking mechanism further releasably locking said brake cable at a specific tension for said rear brake.

7. The bicycle according to claim 1 further comprising a pair of crank arms, each of said crank arms supporting a pedal, said pedals being releasably secured to said crank arms.

8. The modular bicycle according to claim 1 further comprising:
   a chain assembly, said chain assembly comprising:
   a plurality of crank sprockets located on said rear frame section;
   at least one drive sprocket located on said rear frame section;
   a chain extending around and engaging one of said crank sprockets and extending around and engaging one of said drive sprockets; and
   a derailleur mechanism located on said rear frame section, said derailleur mechanism moving said chain from engagement from one said crank sprockets to another of said crank sprockets;
   a shifting mechanism located on said handle bars; and
   at least one cable extending from said shifting mechanism to said derailleur mechanism, said at least one cable and said shifting mechanism providing actuating means for said derailleur mechanism.

9. The bicycle according to claim 8 further comprising a locking mechanism located on said third frame section for releasably locking said at least one shifting cable at a specific tension when said bicycle is in a disassembled state.

10. A multi-geared modular bicycle comprising:
 a separate first section, said first section comprising a front frame section and a first tire:
 a separate second section being directly couplable to said first section, said second section comprising a one-piece central frame comprising a cross bar and a down bar; and
 a separate third section being directly couplable to said second section and said first section, said third section comprising:
 a rear frame section;
 a second tire;
 and a handle bar couplable to said first section;
 a chain assembly, said chain assembly comprising:
 a plurality of crank sprockets located on said rear frame section;
 a plurality of drive sprockets located on said rear frame section;
 a chain extending around and engaging one of said crank sprockets and extending around and engaging of one of said drive sprockets; and
 a front derailleur mechanism located on said rear frame section, said front derailleur mechanism capable of moving said chain from engagement of one of said crank sprockets to another of said crank sprockets;
 a rear derailleur mechanism located on said frame section, said rear derailleur mechanism capable of moving said chain from engagement of ones said drive sprockets to another of said drive sprockets;
 a first shifting mechanism located on said handle bars;
 a first shifting cable extending from said first shifting mechanism to said first derailleur mechanism, said first cable and said first shifting mechanism providing actuating means for said first derailleur mechanism;
 a second shifting mechanism located on said handle bars;
 a second shifting cable extending from said second shifting mechanism to said second derailleur mechanism, said second cable and said second shifting mechanism providing actuating means for said second derailleur mechanism;
 a locking mechanism located on said third frame section for releasably locking said first and said second shifting cables at specific tensions when said bicycle is in a disassembled state; and
 a clamp located on one of said second or said third sections, said clamp being arranged to pivotally encircle the other of said second or said third section and to intersect a stud located on the other of said second or third sections, thereby securely coupling said second section to said third section.

11. The bicycle according to claim 10 further comprising:
 a rear brake for said second tire, said rear brake comprising:
 a brake pad mechanism located on said third section;
 a brake lever located on said handle bar;
 a brake cable extending from said brake lever to said brake pads; and
 said locking mechanism further releasably locking said brake cable at a specific tension for said rear brake.

12. The bicycle according to claim 10 further comprising a pair of crank arms, each of said crank arms supporting a pedal, said pedals being releasably secured to said crank arms.

13. The bicycle according to claim 1, wherein each of said first clamp and said second clamp further comprises:
 a locking section for securing said frame sections together when assembling said bicycle; and
 a release for releasing said frame sections when disassembling said bicycle.

14. A modular bicycle comprising:
 a separate first section, said first section comprising a front frame section, a first tire, and a stud located on said front frame section:
 a separate second section being directly couplable to said first section, said second section comprising a one-piece central frame comprising a cross bar and a down bar;
 a clamp comprising;
  a first clamp section integrally formed with the second section;
  a second clamp section pivotally connected to said first clamp section, said second clamp section being arranged to pivotally encircle said first section;
  a hole located on said first clamp section, said hole being arranged to intersect said stud when, said second clamp section encircles the said first section, thereby securely and releasably coupling said first section to said second section;
  a locking section for securing said frame sections together when assembling said bicycle; and
  a release for releasing said frame sections when disassembling said bicycle;
 a separate third section being directly couplable to said second section, said third section comprising a rear frame section, a stud located on said rear frame section, a second tire, and a handle bar, said handlebar being couplable to said front frame section; and
 a second clamp for vertically connecting said second section to said third section, said second clamp comprising;
  a first clamp section integrally formed with the separate second section;
  a second clamp section pivotally connected to said first clamp section, said second clamp section being arranged to pivotally encircle the said third section;
  a hole located on said first clamp section, said hole being arranged to intersect said stud located on said rear frame section when said second clamp section encircles said third section, thereby releasably and securely coupling said first section to said second section;
  a locking section for securing said frame sections together when assembling said bicycle; and
  a release for releasing said frame sections when disassembling said bicycle.

* * * * *